US006803976B1

(12) United States Patent
Fujioka et al.

(10) Patent No.: US 6,803,976 B1
(45) Date of Patent: Oct. 12, 2004

(54) LCD HAVING ELECTRODE(S) OUTSIDE DISPLAY AREA WHICH ADSORB IONIC IMPURITIES

(75) Inventors: Kazuyoshi Fujioka, Osaka (JP); Kazuko Nakajima, Nara (JP); Tsuyoshi Okazaki, Nara (JP); Takashi Ochi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/577,007

(22) Filed: May 24, 2000

(30) Foreign Application Priority Data

May 25, 1999 (JP) .......................................... 11-145652

(51) Int. Cl.[7] .......................................... G02F 1/1343
(52) U.S. Cl. .......................... 349/54; 349/34; 349/192
(58) Field of Search .............................. 349/34, 54, 192

(56) References Cited

U.S. PATENT DOCUMENTS

| 5,408,345 A | | 4/1995 | Mitsui et al. | |
| 5,805,250 A | * | 9/1998 | Hatano et al. | ................. 349/96 |

FOREIGN PATENT DOCUMENTS

| EP | 0 749 030 A1 | | 12/1996 | | |
| JP | 1-156725 A | | 6/1989 | | |
| JP | 3-118519 A | | 5/1991 | | |
| JP | 4-125617 | | 4/1992 | | |
| JP | 04175723 A | * | 6/1992 | ............. G02F/1/13 |
| JP | 4-295824 | | 10/1992 | | |
| JP | 05323336 A | * | 12/1993 | ......... G02F/1/1341 |
| JP | 6-289408 | | 10/1994 | | |
| JP | 8-201830 | | 8/1996 | | |
| JP | 09244028 A | * | 9/1997 | ......... G02F/1/1337 |
| JP | 10123526 A | * | 5/1998 | ......... G02F/1/1337 |
| JP | 11-038389 | | 2/1999 | | |
| KR | 97 28689 | | 11/1998 | | |

OTHER PUBLICATIONS

JP 5–323336 to Kikuchi et al., machine–translation.*
JP 11–038389 to Ochi, machine–translation.*

* cited by examiner

Primary Examiner—Robert H. Kim
Assistant Examiner—Andrew Schechter
(74) Attorney, Agent, or Firm—Nixon & Vanderhye P.C.

(57) ABSTRACT

A liquid crystal display device of the present invention includes: a pair of substrates opposing each other; a liquid crystal layer interposed between the pair of substrates; a plurality of switching elements arranged in a matrix pattern on one of the pair of substrates; gate signal lines for supplying gate signals for driving the switching elements; source signal lines crossing the gate signal lines for supplying display signals to the switching elements; an interlayer insulating film provided on one of the pair of substrates over the gate signal lines and the source signal lines; and pixel electrodes provided over the gate signal lines and the source signal lines via the interlayer insulating film. The interlayer insulating film on one of the pair of substrates extends to a surrounding region of a display pixel area. An electrode pattern for adsorbing an ionic impurity is provided on the interlayer insulating film in the surrounding region.

14 Claims, 9 Drawing Sheets

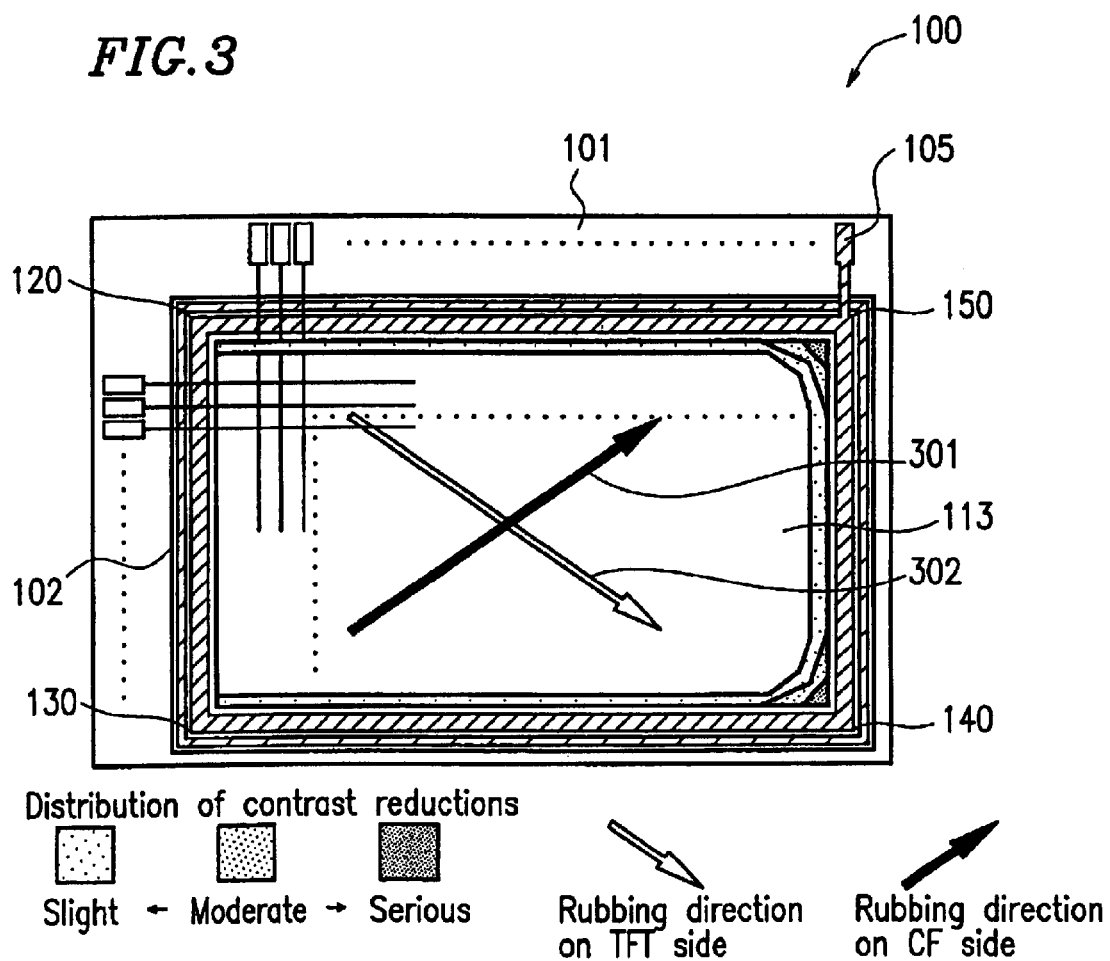

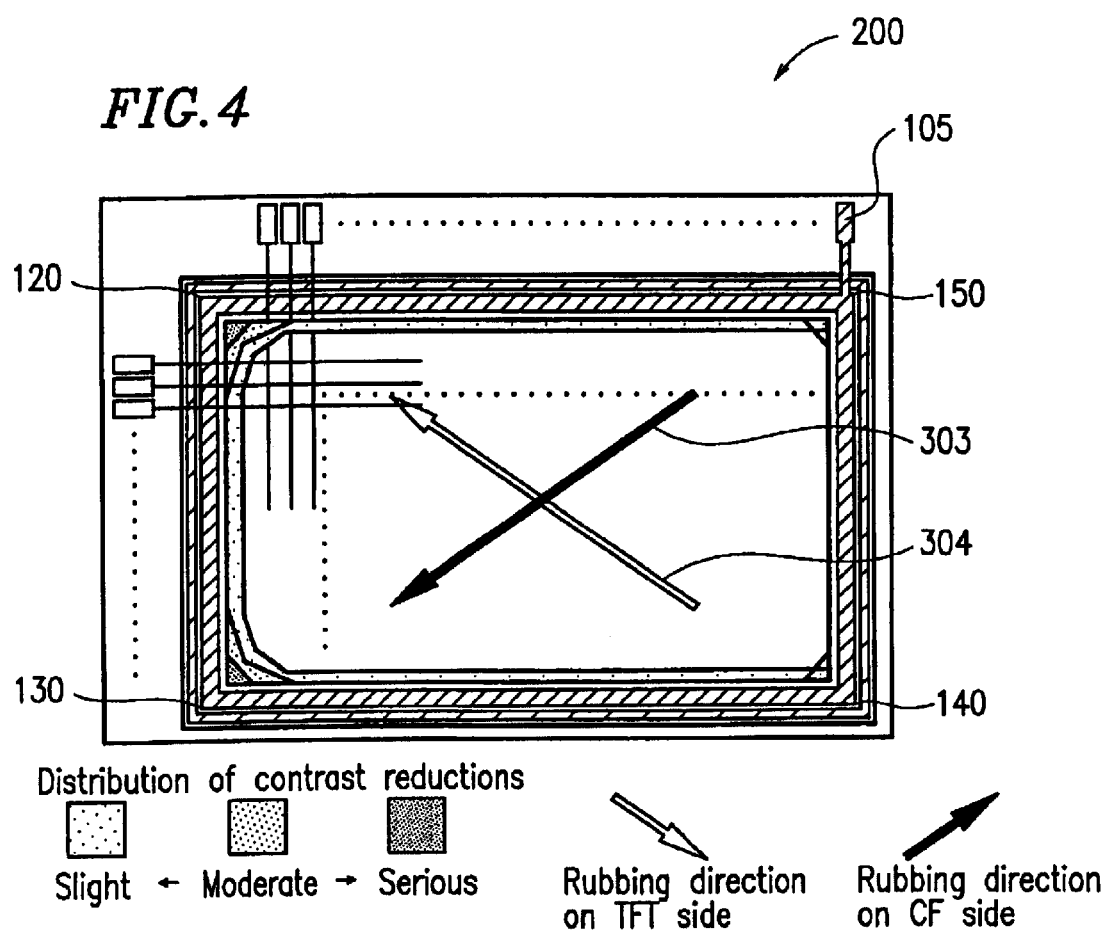

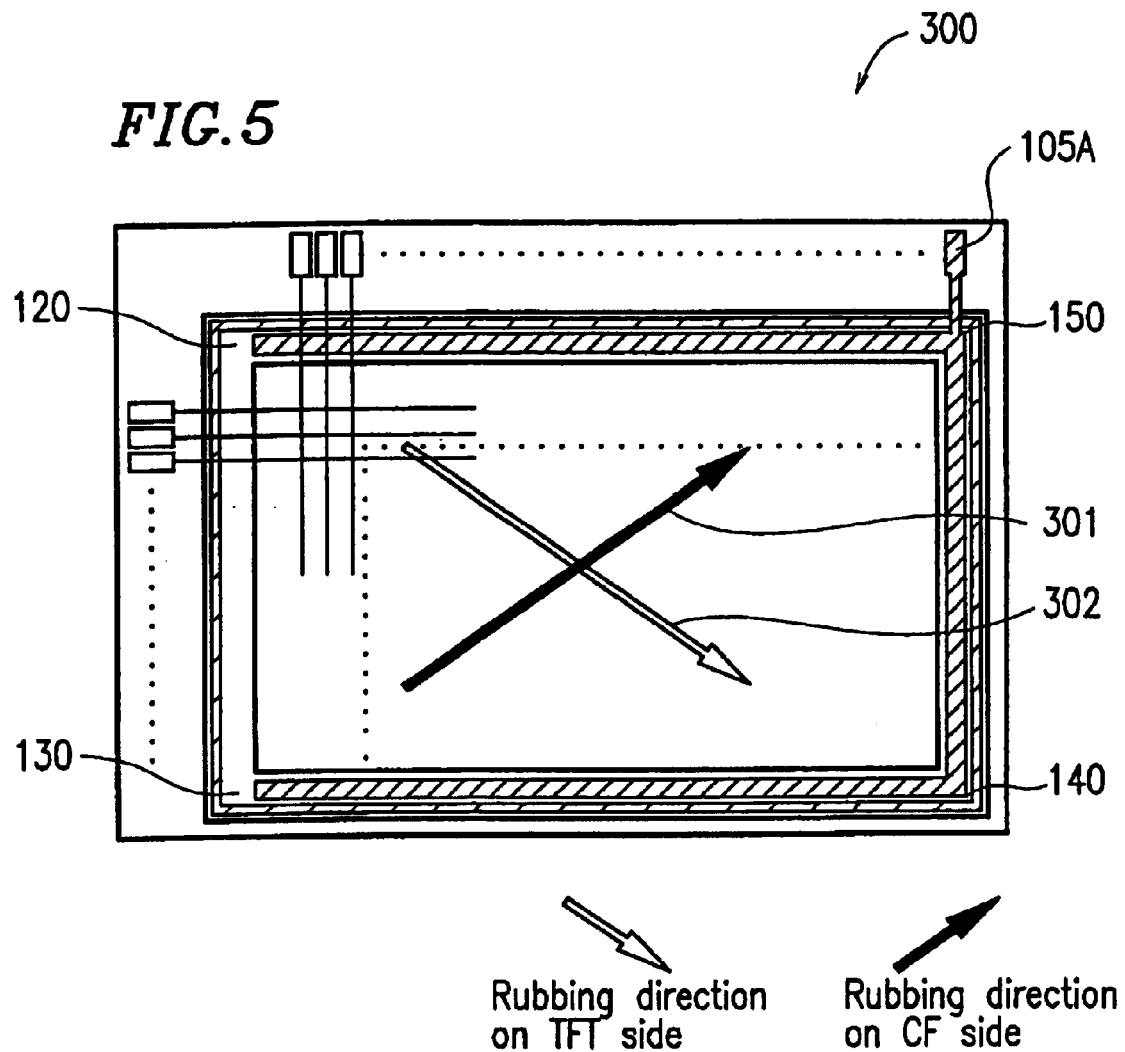

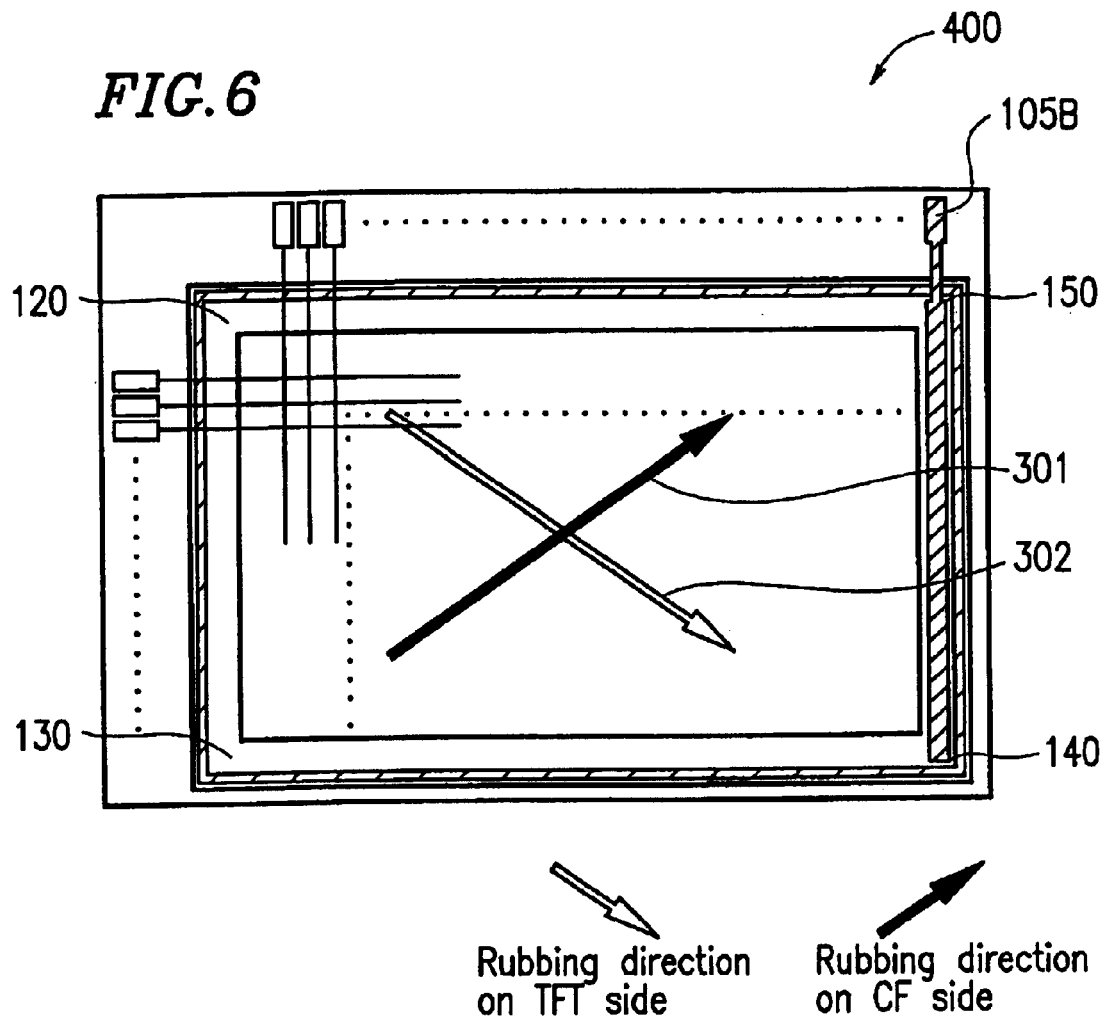

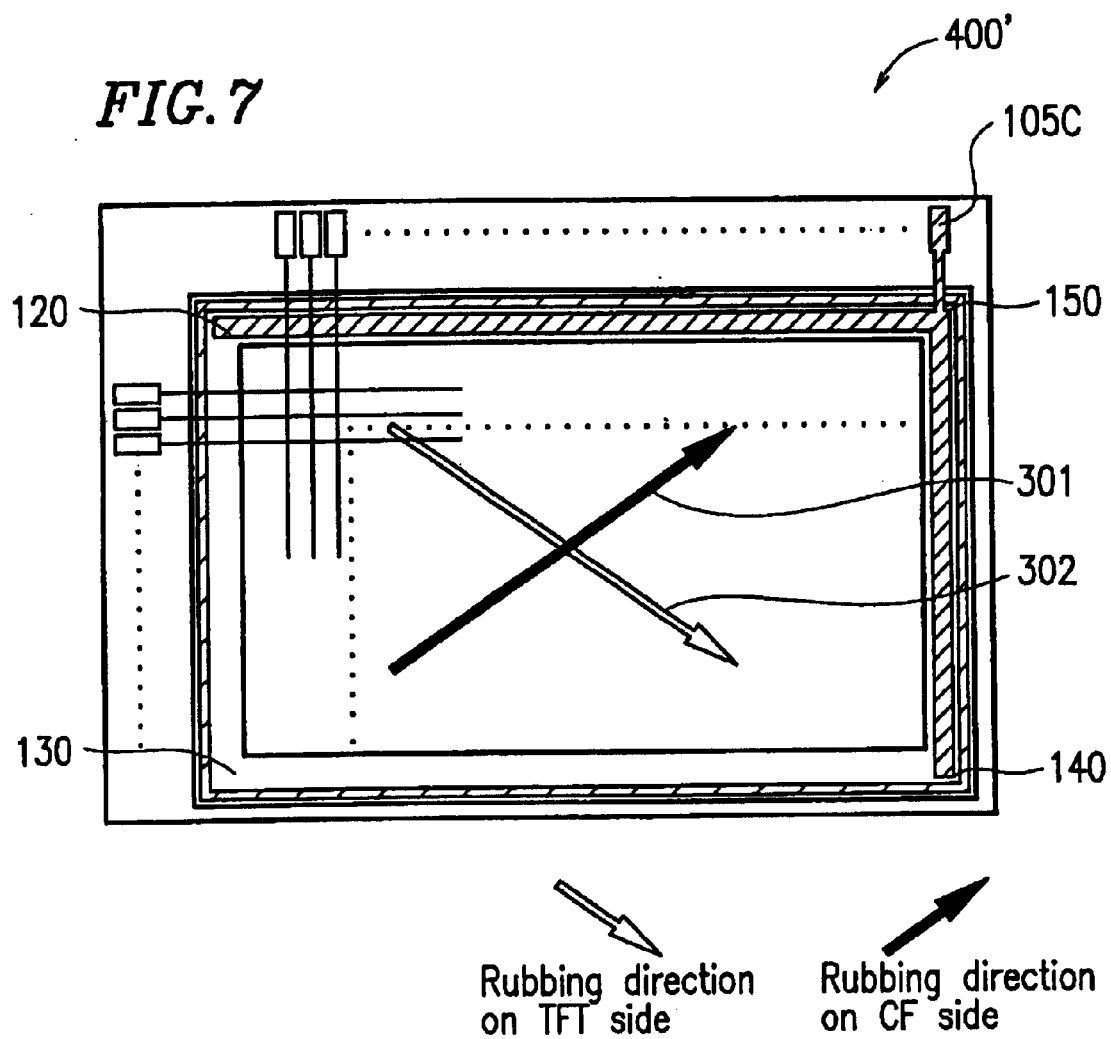

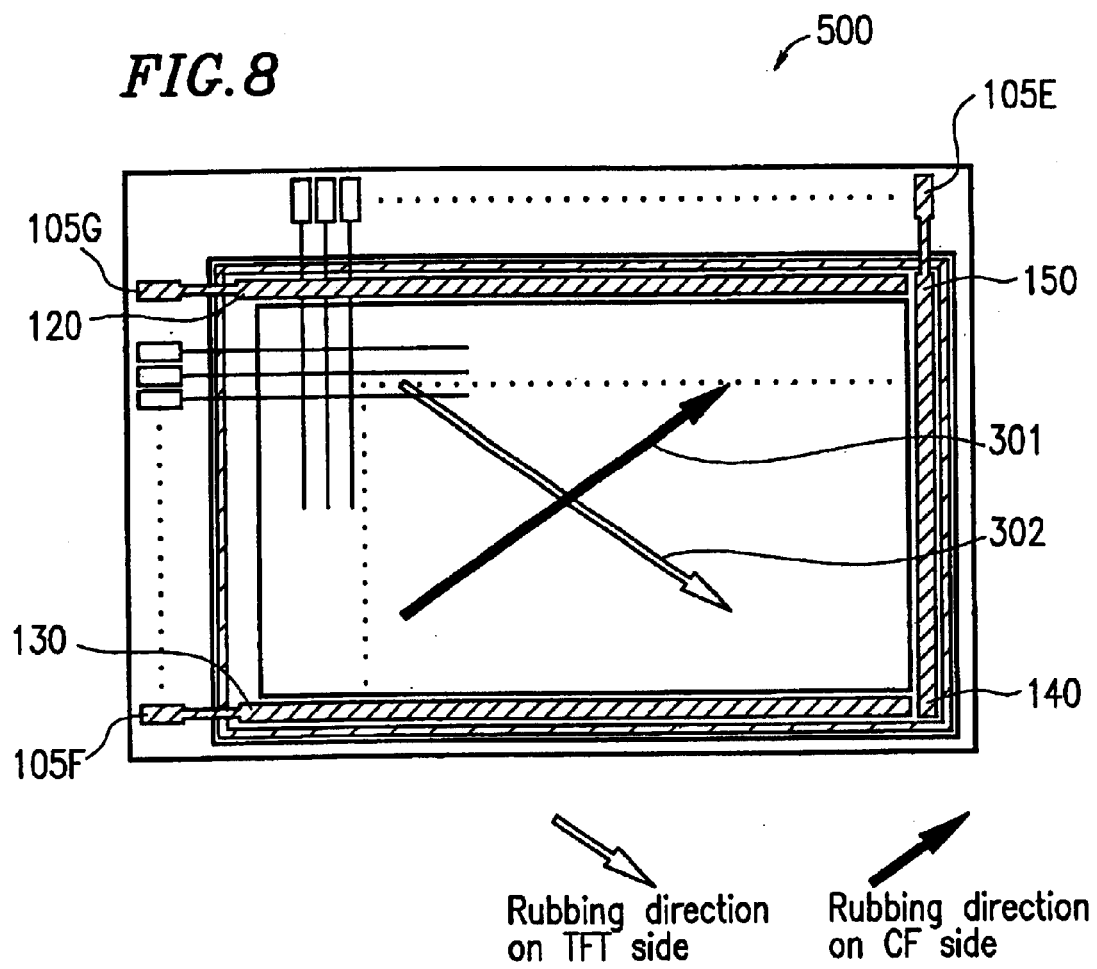

LCD HAVING ELECTRODE(S) OUTSIDE DISPLAY AREA WHICH ADSORB IONIC IMPURITIES

BACKGROUND OF THE INVENTION

1. Field of the Invention

The present invention relates to a liquid crystal display device for use as a display section of a notebook personal computer, a portable terminal apparatus, and the like.

2. Description of the Related Art

FIG. 9 is a circuit diagram illustrating a configuration of a conventional liquid crystal display device 10.

The liquid crystal display device 10 includes a plurality of switching elements (TFTs 2 in this example) which are arranged in a matrix pattern on an active matrix substrate (TFT substrate). The liquid crystal display device 10 also includes gate signal lines 3 for supplying gate signals for driving the TFTs 2 and source signal lines 4 for supplying display signals (source signals) to the TFTs 2. The gate signal lines 3 and the source signal lines 4 are arranged so as to cross each other. The gate electrode of each TFT 2 is electrically connected to the gate signal line 3, the source electrode of each TFT 2 is electrically connected to the source signal line 4, and the drain electrode of each TFT 2 is connected to a pixel electrode 1 and to one electrode of an auxiliary capacitor (Cs) 5. The other electrode of the auxiliary capacitor (Cs) 5 is connected to a common line 6. The TFT substrate opposes a counter substrate (color filter (CF) substrate) with a liquid crystal layer being interposed therebetween.

The liquid crystal display device 10 is driven, for example, by scanning the gate signal lines 3 upwardly or downwardly to turn ON the TFTs 2 along each gate signal line 3. A source signal is applied to each pixel (across the liquid crystal layer in that pixel) so as to charge the liquid crystal layer and the auxiliary capacitor 5 of that pixel to the potential of the source signal, whereby the potential of the liquid crystal layer in each pixel is kept constant after the TFT 2 is turned OFF until the pixel is scanned in the next sequence. Thus, an image is displayed on the liquid crystal display device 10.

When the liquid crystal material of the liquid crystal display device 10 is contaminated with an ionic impurity, some current is conducted through the liquid crystal layer before the next sequence so as to reduce the potential which has been applied across the liquid crystal layer. In such a case, a normal display cannot be maintained.

Such an ionic impurity may be any organic and inorganic impurity, e.g., $Na^+$, $Ca^{2+}$, $Cu^{2+}$, $Cl^-$, $OH^-$, $COOH^-$, or the like. Such an ionic impurity may easily be introduced into the liquid crystal material during the production process of the liquid crystal display device.

In recent years, liquid crystal display devices have been used in portable terminal apparatuses. Therefore, attempts have been made in the art to reduce the power consumption of the liquid crystal display devices so that the portable terminal apparatuses can be used outdoor for a long period of time. Accordingly, it has been necessary to develop a liquid crystal material which can be driven with a low voltage. However, the capability of being driven with a low voltage means that the liquid crystal material has a large dielectric anisotropy, which in turn means that the liquid crystal material itself has a potential. Such a liquid crystal material itself is likely to attract an ionic substance, thereby increasing the probability that the liquid crystal material may be contaminated during the production process of the liquid crystal display device.

It is well known in the art that increasing the auxiliary capacitance Cs is effective to address these problems. However, increasing the auxiliary capacitance Cs has a problem of reducing the aperture area of each pixel. Then, in order to achieve a display brightness of a liquid crystal display device which is equivalent to that of other conventional liquid crystal display devices, it is necessary to increase the illuminance of the back light, which is the light source of the liquid crystal display device. However, the power consumption of a back light typically accounts for about ⅔ of the total power consumption of the liquid crystal display device. Therefore, the power consumption of the liquid crystal display device as a whole cannot be reduced in this way.

These problems have been addressed in the art by, for example, Japanese Laid-Open Publication Nos. 4-125617, 4-295824, 6-289408 and 8-201830, which disclose methods in which the surrounding region of the display pixel area is provided with an electrode pattern. An electric signal having a DC component is externally applied to the electrode pattern to adsorb the ionic impurity which has been introduced into the liquid crystal layer onto the electrode pattern, so as to maintain the purity of the liquid crystal layer in the display pixel area.

However, such conventional methods in which an electrode pattern is provided in the surrounding region of the display pixel area have the following problems.

In Japanese Laid-Open Publication No. 4-125617, an ion adsorption electrode pattern is provided on an active matrix substrate having TFTs provided thereon, while the display electrode on a CF substrate is not provided in a position opposing the electrode pattern.

However, the interval between a region of the display pixel area in which the ion adsorption electrode pattern is provided and a region in which a sealing material is provided is as small as about 1 mm to 3 mm. In order to ensure that the display electrode on the CF substrate does not oppose the ion adsorption electrode pattern, this may be too small for methods which are typically employed in the prior art, i.e., methods in which display electrodes are patterned while directly masking the display electrode portions with a metal mask during the display electrode formation. Thus, it is necessary to pattern the display electrodes on the CF substrate with a photolithography technique, thereby increasing the number of production steps.

Moreover, when such an electrode pattern is provided on a typical liquid crystal display device, an interlayer insulating film is employed to electrically isolate the electrode pattern from the source or gate signal lines which cross the electrode pattern. However, an inorganic film of silicon nitride (SiN), or the like, which is typically employed for the interlayer insulating film is deposited by a CVD (chemical vapor deposition) method, and has a thickness of several hundreds of nanometers and a dielectric constant as high as 8. Therefore, depending upon the potential to be applied to the electrode pattern, the obtained display may be substantially affected by the capacitance at the intersection between the electrode pattern and the signal lines.

In addition, according to the drawings of Japanese Laid-Open Publication No. 4-125617, a protective film is provided on the electrode pattern. When a TFT production process is considered, the protective film needs to be deposited separately, thereby further increasing the number of production steps.

Japanese Laid-Open Publication No. 4-295824 discloses an arrangement in which an ion adsorption electrode pattern is provided between a display region and a sealing material. This conventional technique is directed primarily to duty drive type liquid crystal display devices. Therefore, the electrode pattern can be provided only in a direction parallel to segment lines and in a direction parallel to common lines. Signals are input to the segment lines and the common lines individually. However, in a liquid crystal display device with TFTs, in order to input signals other than the counter potential to the CF substrate, which corresponds to the substrate on which the common lines are provided, it is necessary to pattern the display electrodes on the CF substrate by a photolithography technique as in Japanese Laid-Open Publication No. 4 -125617.

Japanese Laid-Open Publication No. 8-201830 discloses a similar arrangement for liquid crystal display devices with TFTs. This arrangement also has a problem of increasing the number of production steps.

In Japanese Laid-Open Publication No. 6-289408, an ion adsorption electrode pattern can be formed from a conductive film which is also used to form the TFTS. Therefore, the problem of increasing the number of production steps, as needed in the above three patent publications, can be avoided. In the liquid crystal display device of Japanese Laid-Open Publication No. 6-289408, one or both of an alignment film or an overcoat film is removed above the electrode pattern so that an alternating voltage is applied to the electrode pattern and a DC potential is applied across the liquid crystal layer. Therefore, the region in which the electrode pattern is formed is different from the display pixel area. Thus, an asymmetric potential (=DC component) corresponding to the dielectric constant of the removed alignment film or overcoat film is generated and applied across the liquid crystal layer.

However, this arrangement presumes that an overcoat film is provided over the display electrodes in the display pixel area. Typically-employed liquid crystal display devices do not have any film other than the alignment film provided on the display electrodes. Therefore, this conventional technique differs from a liquid crystal display device of the present invention in terms of the basic structure.

Moreover, Japanese Laid-Open Publication No. 6-289408 states that the above-described effects can be obtained with a DC potential of 5 mV to 100 mV. However, in high definition type (XGA or SXGA type) liquid crystal display devices of which the diagonal screen size is about 10 inches or more have a DC potential difference in the display screen plane occurring due to a signal delay through signal lines and/or display electrodes on the CF substrate. A DC potential difference as large as 100 mV has been observed in such liquid crystal display devices. Therefore, it is believed that the conventional technique cannot improve the visible defects which occur due to ionic impurities as described above.

SUMMARY OF THE INVENTION

According to one aspect of this invention, a liquid crystal display device includes: a pair of substrates opposing each other: a liquid crystal layer interposed between the pair of substrates; a plurality of switching elements arranged in a matrix pattern on one of the pair of substrates: gate signal lines for supplying gate signals for driving the switching elements; source signal lines crossing the gate signal lines for supplying display signals to the switching elements: an interlayer insulating film provided on one of the pair of substrates over the gate signal lines and the source signal lines; and pixel electrodes provided over the gate signal lines and the source signal lines via the interlayer insulating film. The interlayer insulating film on one of the pair of substrates extends to a surrounding region of a display pixel area. An electrode pattern for adsorbing an ionic impurity is provided on the interlayer insulating film in the surrounding region.

In one embodiment of the invention, the pixel electrodes are provided to partially overlap at least one of the gate signal lines and the source signal lines.

In one embodiment of the invention, the pixel electrodes and the electrode pattern are made of a metal material having a reflective property.

In one embodiment of the invention, the electrode pattern is provided inward with respect to a sealing material with which the pair of substrates are attached together.

In one embodiment of the invention, the electrode pattern is covered with an alignment film.

In one embodiment of the invention, an electric signal having a DC potential is input to the electrode pattern.

In one embodiment of the invention, an electric signal which is input to the electrode pattern is supplied from at least one of a power supply for a source driving circuit and a power supply for a gate driving circuit.

In one embodiment of the invention, the electrode pattern is divided into a plurality of segments, and an electric signal is individually input to each of the segments.

In one embodiment of the invention, the display pixel area has a generally rectangular shape. The pair of substrates are arranged so that a rubbing direction of one of the substrates which is represented by a first arrow crosses a rubbing direction of the other one of the substrates which is represented by a second arrow, the first and second arrow each extending from its tail to its head. The electrode pattern extends only along three sides of the display pixel area, including a first side interposed between the head of the first arrow and the head of the second arrow, and second and third sides which respectively extend from opposite ends of the first side.

In one embodiment of the invention, the pair of substrates are arranged so that a rubbing direction of one of the substrates which is represented by a first arrow crosses a rubbing direction of the other one of the substrates which is represented by a second arrow, the first and second arrow each extending from its tail to its head. The electrode pattern extends only along one side of the display pixel area interposed between the head of the first arrow and the head of the second arrow.

In one embodiment of the invention, the interlayer insulating film is made of an organic material.

In one embodiment of the invention, the liquid crystal display device includes a generally rectangular display pixel area. A rubbing direction of at least one of the substrates is represented by an arrow pointing to a corner of the generally rectangular display pixel area. The electrode pattern extends along two sides of the generally rectangular display pixel area which are connected together by the corner that is pointed to by the arrow.

In one embodiment of the invention, the liquid crystal display device includes a generally rectangular display pixel area. A rubbing direction of one of the substrates is represented by a first arrow pointing to a first corner of the generally rectangular display pixel area, and a rubbing direction of the other one of the substrates is represented by a second arrow pointing to a second corner of the generally rectangular display pixel area. The electrode pattern extends along a first pair of sides which are connected together by the first corner and along a second pair of sides which are connected together by the second corner, wherein the first pair of sides and the second pair of sides may share one side with each other.

In one embodiment of the invention, the electrode pattern is formed simultaneously with the pixel electrodes.

The functions of the present invention will now be described.

As described above, the present invention provides a liquid crystal display device in which pixel electrodes are provided over gate signal lines and source signal lines via an interposing interlayer insulating film, wherein the interlayer insulating film extends to a surrounding region of a display pixel area (As used herein, the term "surrounding region of a display pixel area" refers to a region which surrounds the display pixel area and is outside the display pixel area) on which an electrode pattern for adsorbing an ionic impurity is provided. The electrode pattern can be formed simultaneously with the pixel electrode from the same material, thereby avoiding an increase in the number of production steps. Moreover, since an alignment film is provided on the electrode pattern, it is not necessary to separately provide a protective film, thereby eliminating the step of forming a protective film as in the prior art. Furthermore, since the counter electrode on the counter substrate (CF substrate) can be provided on the electrode pattern, it is not necessary to pattern the counter electrode on the CF substrate by a photolithography technique, or the like.

The pixel electrodes may be provided to partially overlap at least one of the gate signal lines and the source signal lines. The liquid crystal display device of the present invention may be a reflective liquid crystal display device in which the pixel electrodes and the electrode pattern are made of a metal material having a reflective property.

The interlayer insulating film may be made of an organic material. In such a case, it is possible to reduce the capacitance at each of intersections between the electrode pattern and the signal lines. As described in Japanese Laid-Open Publication No. 9-96837, an acrylic resin, for example, has a dielectric constant of 3.7 and can be deposited to a thickness of 1.5 $\mu$m to 5 $\mu$m using a spin coating method. Therefore, the capacitance at each of the intersections can be $\frac{1}{6}$ to $\frac{1}{22}$ of that which would result when using a conventional insulating film made of silicon nitride, thereby reducing the influence on the display to a level such that the influence cannot be observed by the viewer.

An ionic impurity can be adsorbed onto the surf ace of the ionic impurity adsorbing electrode pattern by inputting a DC potential having the polarity opposite to that of the ionic impurity to the electrode pattern, thereby preventing the display quality from lowering due to the ionic impurity, while improving the reliability, as will be described below in Embodiments 1–3.

The electric signal is input to the ionic impurity adsorbing electrode pattern only to provide a potential difference across the liquid crystal layer and does not substantially flow as an electric current. Therefore, the electric signal can be supplied to the electrode pattern by using: a DC power supply for driving ICs, or the like, of driver circuits; a DC power supply for supplying a ±potential for gate signals; a power supply for supplying rectangular wave signals such as source signals and common signals; and the like, which are used in the existing liquid crystal display devices.

By covering the ionic impurity adsorbing electrode pattern with an alignment film, an electrically attracted ionic impurity can be adsorbed onto the alignment film itself. Moreover, the alignment film can also function as an insulating film for preventing leakage between the electrode pattern and the counter electrodes on the counter substrate (CF substrate).

The ionic impurity adsorbing electrode pattern may be divided into a plurality of segments, and an electric signal may be individually input to each of the segments, as will be described below in Embodiment 3. Also in this way, it is possible to prevent visible defects due to an ionic impurity, while obtaining a good display.

Usually, contrast reductions are significant only along particular side/sides of the display pixel area. Therefore, the ionic impurity adsorbing electrode pattern may be provided only along these sides, as in Embodiment 2 to be described below.

The liquid crystal display device of the present invention may be a reflective liquid crystal display device in which the pixel electrodes and the ion adsorption electrode pattern are made of a reflective metal material.

Thus, the invention described herein makes possible the advantages of providing a liquid crystal display device which is capable of avoiding visible defects occurring due to an ionic impurity which has been introduced into the liquid crystal layer, whose display is not influenced by input signals to the electrode pattern, which can be produced without increasing the number of production steps, and in which it is not necessary to separately provide a source of signal input for the electrode pattern.

These and other advantages of the present invention will become apparent to those skilled in the art upon reading and understanding the following detailed description with reference to the accompanying figures.

BRIEF DESCRIPTION OF THE DRAWINGS

FIG. 3 is a plan view illustrating a distribution of contrast reductions for the liquid crystal display device according to Embodiment 1 of the present invention;

FIG. 4 is a plan view illustrating a distribution of contrast reductions for another liquid crystal display device according to Embodiment 1 in which the rubbing directions are changed from those of the liquid crystal display device shown in FIG. 3;

FIG. 5 is a plan view illustrating a configuration of a liquid crystal display device according to Embodiment 2 of the present invention;

FIG. 6 is a plan view illustrating a configuration of another liquid crystal display device according to Embodiment 2 of the present invention;

FIG. 7 is a plan view illustrating a configuration of still another liquid crystal display device according to Embodiment 2 of the present invention;

FIG. 8 is a plan view illustrating a configuration of a liquid crystal display device according to Embodiment 3 of the present invention.

DESCRIPTION OF THE PREFERRED EMBODIMENTS

Various embodiments of the present invention will now be described with reference to the accompanying drawings.

(Embodiment 1)

Figure 1:
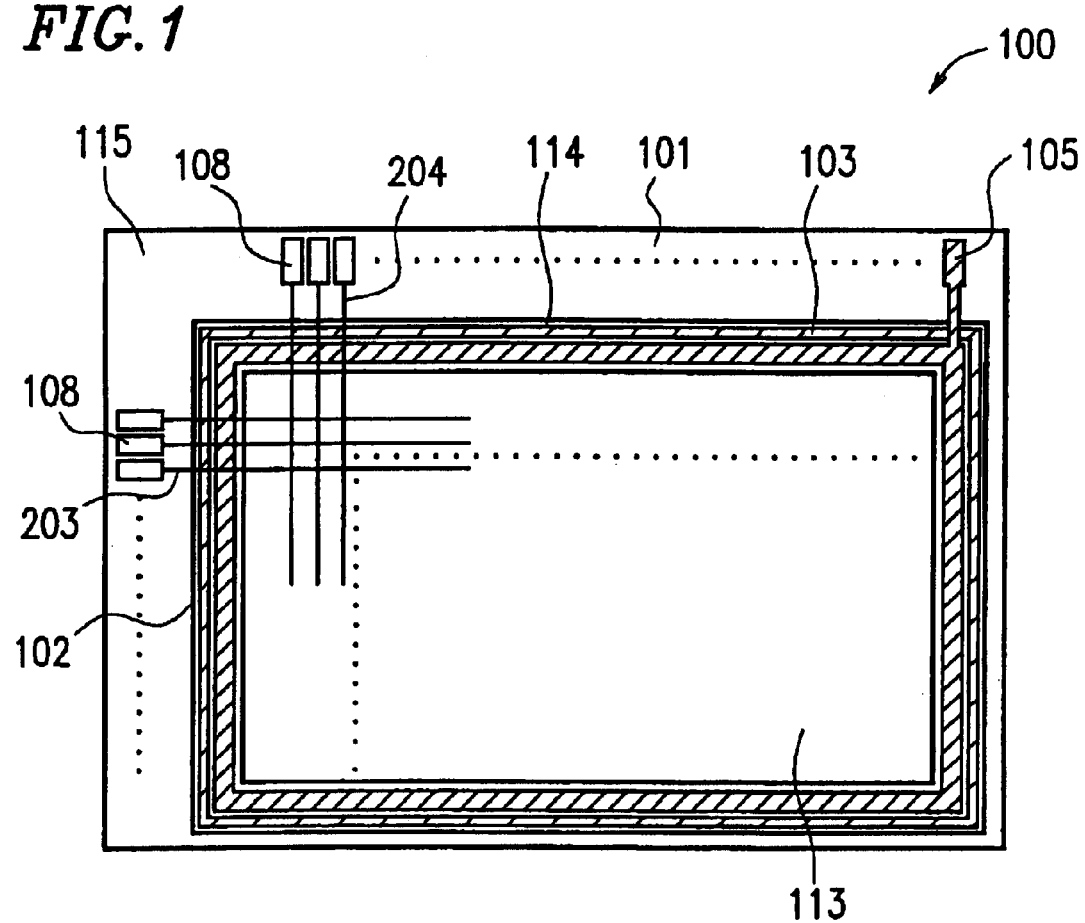
FIG. 1 is a plan view illustrating a configuration of a liquid crystal display device according to Embodiment 1 of the present invention.
Figure 2A:
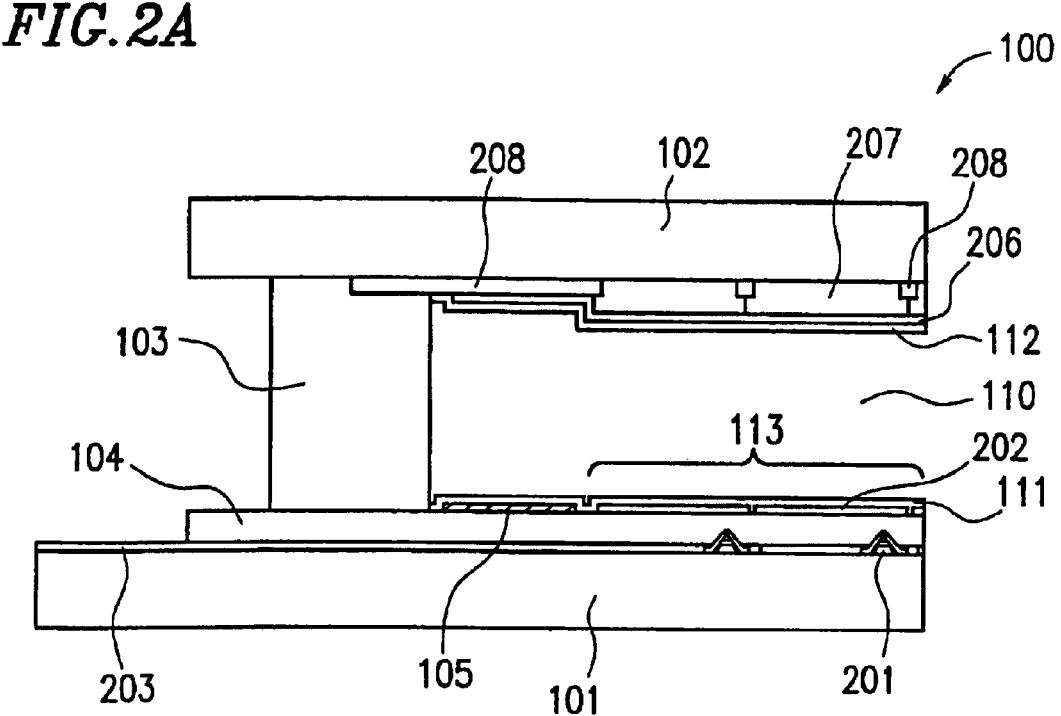
FIG. 2A is a cross-sectional view illustrating the configuration of the liquid crystal display device according to Embodiment 1 of the present invention.
Figure 2B:
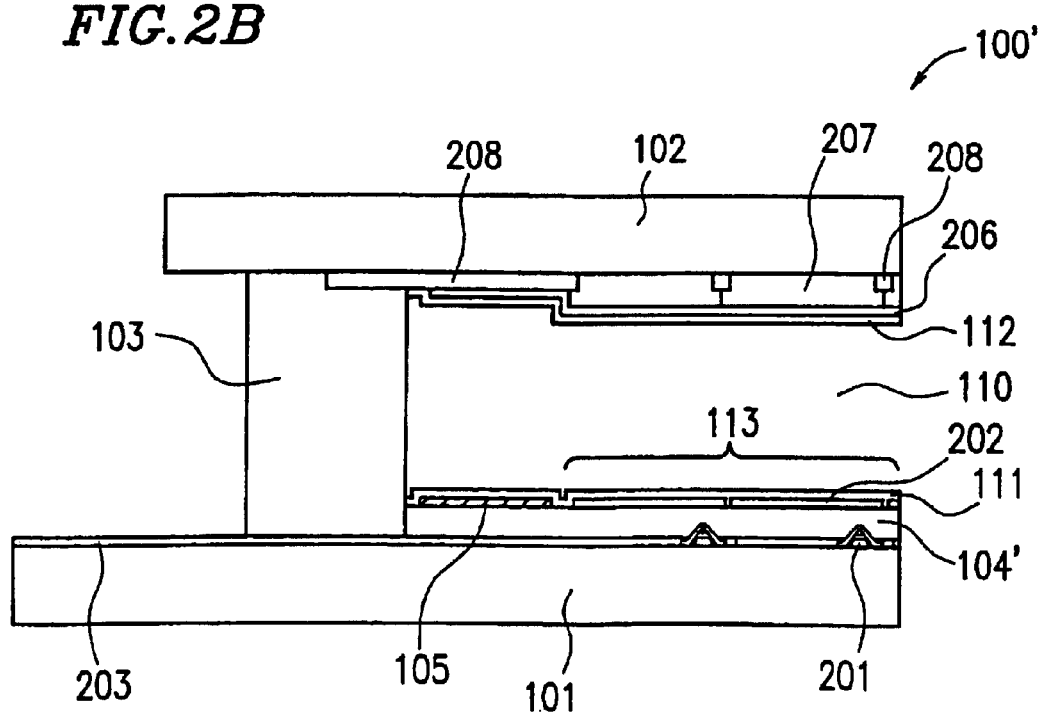
FIG. 2B is a cross-sectional view illustrating a configuration of a liquid crystal display device according to a variation of Embodiment 1 of the present invention.
Figure 9:
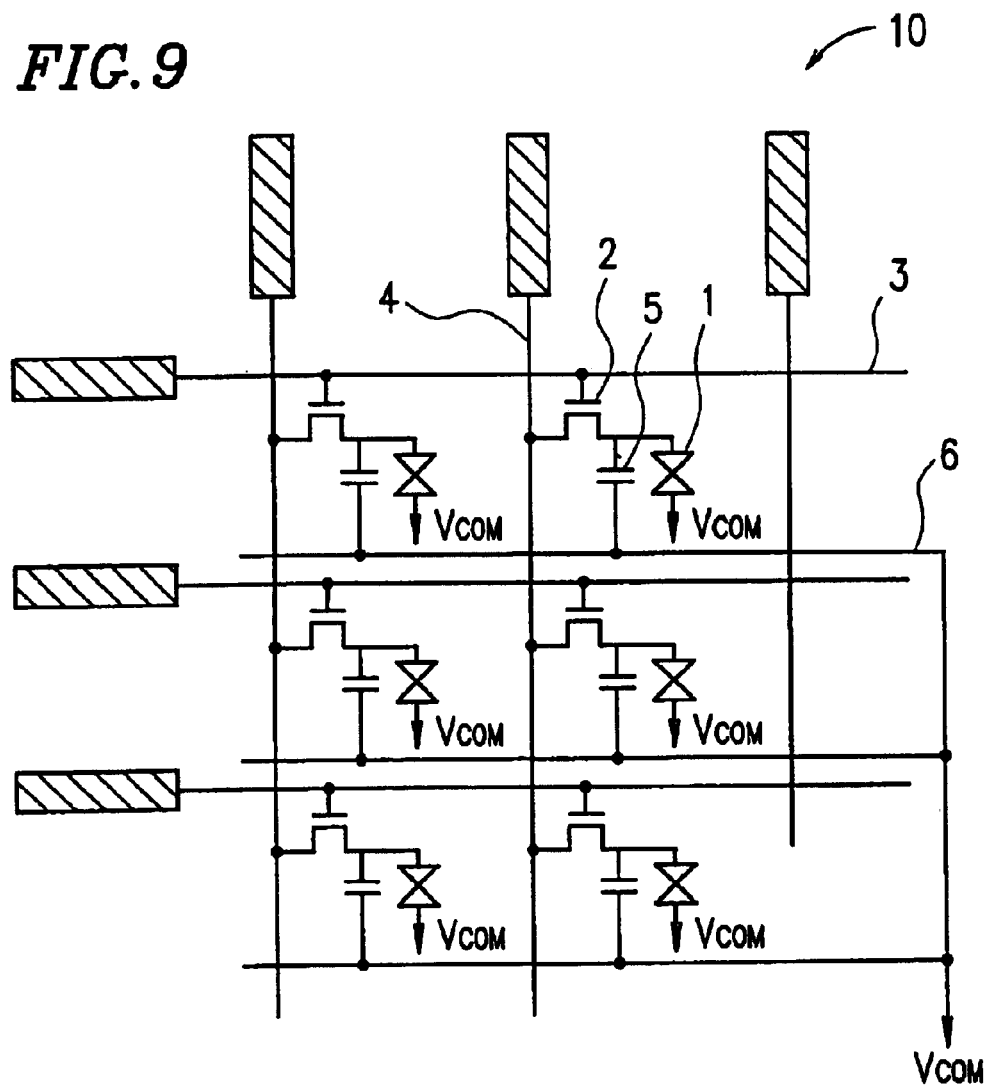
FIG. 9 is a circuit diagram illustrating a configuration of a conventional liquid crystal display device.

FIG. 1 is a plan view illustrating a liquid crystal display device 100 according to Embodiment 1 of the present invention. FIG. 2A is a cross-sectional view illustrating the same. FIG. 2B is a cross-sectional view illustrating a liquid crystal display device 100' according to a variation of Embodiment 1.

The liquid crystal display device 100 includes a TFT substrate 101 having pixel electrodes 202 provided thereon, and a CF substrate 102 having counter electrodes 206 provided thereon. The TFT substrate 101 and the CF substrate 102 oppose each other with a liquid crystal layer 110 being interposed therebetween. Each pixel is defined as an area interposed between one of the pixel electrodes 202 and a corresponding part of the counter electrodes 206. A sealing material 103 is provided in the surrounding region of a display pixel area 113 including the pixels. An electrode pattern 105 for adsorbing an ionic impurity is provided between the display pixel area 113 and the sealing material 103. In this embodiment, the display pixel area 113 of the liquid crystal display device 100 has a rectangular shape. However, the shape of the display pixel area of the present invention is not limited to rectangular. The display pixel area of the present invention may have any suitable shape including a polygonal shape, for example.

The TFT substrate 101 is provided with gate signal lines 203 for supplying gate signals for driving TFTs 201 and source signal lines 204 for supplying display signals (source signals) to the TFTs 201. The gate signal is lines 203 and the source signal lines 204 are arranged to cross (perpendicular in this example) with each other. Each of the TFTs 201 is provided as a switching element in the vicinity of an intersection between one of the gate signal lines 203 and one of the source signal lines 204. The pixel electrodes 202 are provided so as to partially overlap at least one of the gate signal lines 203 and the source signal lines 204 via an interlayer insulating film 104 made of an organic material therebetween. Each pixel electrode 202 is connected to the drain electrode of the TFT 201 via a contact hole (not shown) in the interlayer insulating film 104. The material of the interlayer insulating film 104 is not limited to organic materials. For example, material of the interlayer insulating film 104 may be $SiN_x$ or $SiO_2$. An alignment film 111 is provided on the interlayer insulating film 104. The gate signal lines 203 and the source signal lines 204 extend beyond a frame region 114 into a terminal region 115 in which input terminals 108 of the gate signal lines 203 and the source signal lines 204 are provided. Signal voltages for driving the TFTs 201 are input to the gate signal lines 203 through the input terminals 108 thereof. Signal voltages of display data are input to the source signal lines 204 through the input terminals 108 thereof. The electrode pattern 105 is provided along the peripheral region of the interlayer insulating film 104 so as to surround the periphery of the display pixel area 113 with an extension into the terminal region 115. An electric signal is input to the electrode pattern 105 through the extension. The electric signal to be input to the electrode pattern 105 may be supplied from at least one of the power supply for the source driving circuit and the power supply for the gate driving circuit. As a result, it is not necessary to separately provide a source of signal input for the electrode pattern 105.

The CF substrate 102 includes a counter electrode 206 which is provided on a CF layer 207 having a black matrix 208. The alignment film 112 is provided over the CF layer 207 and the black matrix 208.

The TFT substrate 101 as described above can be produced as follows.

First, the TFTs 201 are provided on a substrate. The interlayer insulating film 104 is formed over the TFTs 201 by spincoating a photosensitive acrylic resin to a thickness of 3 μm. Contact holes (not shown) are provided in the interlayer insulating film 104. Then, the pixel electrodes 202 are formed by patterning an ITO (indium tin oxide) material by a sputtering method, and the drain electrodes of the TFTs 201 are respectively connected to the pixel electrodes 202 via the contact holes in the interlayer insulating film 104. During this production step, the electrode pattern 105 is simultaneously formed from the ITO material from which the pixel electrodes 202 are formed. Then, the alignment film 111 is formed over the electrode pattern 105 and the pixel electrodes 202 and subjected to an alignment treatment such as rubbing. Thus, the TFT substrate 101 is produced.

Referring to FIG. 2B, an interlayer insulating film 104' may not be present under or outside the sealing material 103 region as long as the interlayer insulating film 104' underlies the electrode pattern 105.

The following reliability tests were conducted for the liquid crystal display device 100.

First, the liquid crystal display device 100 was subjected to a conduction reliability test in a thermostat at 60° C. without applying a voltage to the electrode pattern 105. As a result, the contrast started to decrease along the peripheral portion of the display pixel area 113 at hour 300, as shown in Table 1 below.

The "decrease" or "reduction" of the contrast as used herein refers to a condition where a black display (in the presence of an applied voltage) does not reach a sufficient darkness. The "decrease" or "reduction" of the contrast is not dependent upon the length of the signal writing period ("$T_{on}$ period"), but is dependent upon the length of the signal retaining period ("$T_{off}$ period"). When the $T_{off}$ period is long, the darkness of the black display is reduced thereby making the black display appear whiter. When the $T_{off}$ period is short, a black display reaches a sufficient darkness. No change in the display was observed when the off voltage ($V_{gl}$), being dependent upon the off characteristics of TFTs, was varied in one direction. This shows that a leak defect occurred through the liquid crystal layer 110 due to the introduction of an ionic impurity into the liquid crystal layer 110.

After the liquid crystal display device 100, whose contrast has once been reduced, is left standing in a thermostat at a temperature equal to or greater than the phase transition temperature $T_{ni}$ of the liquid crystal material for a few hours without electric conduction therethrough, the ionic impurity diffuses across the liquid crystal layer 110 and the defect disappears. In this way, the conduction reliability test was repeatedly conducted for the same liquid crystal display device 100, which exhibited substantially the same defect at substantially the same time.

Then, after the contrast was recovered by leaving the device in a thermostat at a temperature equal to or greater than the phase transition temperature $T_{ni}$ of the liquid crystal material for a few hours without electric conduction therethrough, the reliability test was conducted in a thermostat at 60° C. while applying a DC voltage of +3.3 V through the electrode pattern 105. Similarly, the reliability test was conducted with a DC voltage of −3.3 V. The results are shown in Table 1 below.

TABLE 1

| Applied voltage (V) | Duration of reliability test (hours) | | | | | | | | | |
|---|---|---|---|---|---|---|---|---|---|---|
| | 100 | 200 | 300 | 400 | 500 | 600 | 700 | 800 | 900 | 1000 |
| 0 | ○ | ○ | Δ | X | X | X | X | X | X | X |
| +3.3 | ○ | ○ | ○ | ○ | ○ | ○ | ○ | ○ | ○ | ○ |
| −3.3 | ○ | ○ | Δ | X | X | X | X | X | X | X |

○ . . . No stain
Δ . . . Stain observed only at corners (defective)
X . . . Stain observed along entire sides (defective)

As can be seen from Table 1, the defect started to appear at around hour 300 both when no voltage was applied through the electrode pattern 105 and when a voltage of −3.3 V was applied therethrough. On the contrary, the defect did not appear in over 1000 hours of electrical conduction when +3.3 V was applied through the electrode pattern 105.

It can be seen from the above that the cause of the reduction in the contrast of the display observed in this test is negative ion.

Then, after a voltage of +3.3 V was applied through the electrode pattern 105 followed by an electrical conduction through the liquid crystal layer for 1000 hours, the conduction test was continued in the absence of an applied voltage through the electrode pattern 105. As a result, a defect occurred after 400 hours of electrical conduction through the liquid crystal layer 110. Moreover, a device which once had the defect after applying no voltage through the electrode pattern 105 and a device which once had the defect after applying a voltage of −3.3 V through the electrode pattern 105 were applied with a voltage of +3.3 V through the electrode pattern 105 after the defect had occurred. As a result, for both devices, the defect disappeared in 24 hours. Thereafter, no defect was observed in these devices over 1000 hours of electrical conduction through the liquid crystal layer 110.

Furthermore, a device which had the defect after a voltage application of +3.3 V through the electrode pattern 105 followed by an electrical conduction through the liquid crystal layer for 1000 hours and then no voltage application therethrough for 500 hours, was left standing in a thermostat at a temperature equal to or greater than the phase transition temperature $T_{ni}$ of the liquid crystal material for a few hours without electric conduction therethrough, the conduction test was conducted in the absence of an applied voltage through the electrode pattern 105. As a result, a defect occurred at hour 300.

In view of the above, it can be assumed that an ionic impurity once adsorbed onto the electrode pattern 105 is moved to and adsorbed onto the alignment film 111 provided on the surface of the electrode pattern 105.

Another test was conducted without providing the alignment film 111 on the surface of the electrode pattern 105.

The liquid crystal display device had a defect after 400 hours of electrical conduction through the liquid crystal layer when no voltage was applied through the electrode pattern. It was previously confirmed that this is a defect due to the individual difference which can be recovered by leaving the device standing in a thermostat at a temperature equal to or greater than the phase transition temperature $T_{ni}$ of the liquid crystal material for a few hours without electric conduction therethrough, after which substantially the same defect occurs at substantially the same time when the reliability test is repeated, as in the reliability tests described above.

After applying a voltage of +3.3 V through the electrode pattern of the liquid crystal display device for 1000 hours, the conduction test was continued with no voltage application through the electrode pattern. As a result, a defect occurred after 20 hours of electrical conduction through the liquid crystal layer.

It is believed that the defect occurred in such a short period of time because the ionic impurity dispersed across the liquid crystal layer was once attracted to and adsorbed onto the electrode pattern, but then lost the potential for adsorption and started to diffuse from the electrode pattern.

This also shows that the alignment film has an effect of adsorbing an ionic impurity onto the surface thereof.

In the liquid crystal display device of the present embodiment, the pixel electrodes on the interlayer insulating film may or may not partially overlap at least one of the gate signal lines and the source signal lines.

The liquid crystal display device of the present embodiment may be a reflective liquid crystal display device in which the pixel electrodes and the ionic impurity adsorbing electrode pattern on the interlayer insulating film are made of a reflective metal material.

(Embodiment 2)

In Embodiment 2, the arrangement of the ionic impurity adsorbing electrode pattern will be discussed.

In Embodiment 1 above, the electrode pattern 105 is arranged to completely surround the display pixel area 113. However, the reduction in the contrast of the display has a distribution as shown in FIG. 3, and the electrode pattern 105 may partially be omitted in view of such a distribution.

The rubbing directions of the liquid crystal display device 100 of the present embodiment are as shown in FIG. 3. For illustration purposes, in the following description, the upper left, lower left, lower right and upper right corners of the liquid crystal display device 100 will be referred to as "first corner 120", "second corner 130", "third corner 140" and "fourth corner 150", respectively. Referring to FIG. 3, the rubbing direction on the CF substrate 102 is represented by an arrow 301 which extends generally from the second corner 130 to the fourth corner 150, and the rubbing direction on the TFT substrate 101 is represented by an arrow 302 which extends generally from the first corner 120 to the third corner 140. Herein, for the sake of simplicity, the rubbing direction of an alignment film on each substrate is represented by a single arrow which points to a corner of the display pixel area 113. It is understood, however, that the rubbing treatment is actually performed across the entire surface of the alignment film, not only along a single line thereon. It is shown in FIG. 3 that the contrast reductions are significant along particular sides of the display pixel area 113, i.e., a side which is interposed between the head of the arrow 302 (corresponding to the third corner 140) and the head of the arrow 301 (corresponding to the fourth corner 150), another side which is interposed between the tail of the arrow 302 (corresponding to the first corner 120) and the head of the arrow 301 (corresponding to the fourth corner 150), and still another side which is interposed between the head of the arrow 302 (corresponding to the third corner 140) and the tail of the arrow 301 (corresponding to the second corner 130).

In order to verify the cause of the contrast reductions, the contrast of the display was observed for a liquid crystal display device 200 in which the rubbing directions are changed from those of the liquid crystal display device 100 as shown in FIG. 3. The rubbing direction on the CF substrate of the liquid crystal display device 200 is represented by an arrow 303 which extends generally from the fourth corner 150 to the second corner 130, and the rubbing direction on the TFT substrate is represented by an arrow 304 which extends generally from the third corner 140 to the first corner 120. Thus, the rubbing directions on the CF substrate and the TFT substrate of the liquid crystal display device 200 (which are represented by the arrows 303 and 304, respectively) are opposite respectively to those on the CF substrate and the TFT substrate of the liquid crystal display device 100 (which are represented by the arrows 301 and 302, respectively). As shown in FIG. 4, in the liquid crystal display device 200, the contrast reductions were significant along particular sides of the display pixel area 113, i.e., a side which is interposed between the head of the arrow 304 (corresponding to the first corner 120) and the head of the arrow 303 (corresponding to the second corner 130), another side which is interposed between the tail of the arrow 304 (corresponding to the third corner 140) and the head of the arrow 303 (corresponding to the second corner 130), and still another side which is interposed between the head of the arrow 304 (corresponding to the first corner 120) and the tail of the arrow 303 (corresponding to the fourth corner 150).

In view of the above, another liquid crystal display device 300 was produced as shown in FIG. 5, with the same rubbing directions on the CF substrate and the TFT substrate (represented by the arrows 301 and 302, respectively) as those of the liquid crystal display device 100 shown in FIG. 3. In the liquid crystal display device 300, an electrode pattern 105A was provided only along the three sides of the display pixel area along which the contrast reductions were significant. Specifically, the electrode pattern 105A is provided along three sides of the display pixel area, i.e., a side which is interposed between the head of the arrow 302 (corresponding to the third corner 140) and the head of the arrow 301 (corresponding to the fourth corner 150), another side which is interposed between the tail of the arrow 302 (corresponding to the first corner 120) and the head of the arrow 301 (corresponding to the fourth corner 150), and still another side which is interposed between the head of the arrow 302 (corresponding to the third corner 140) and the tail of the arrow 301 (corresponding to the second corner 130). The liquid crystal display device 300 has an electrode pattern 105A which is substantially the same as the electrode pattern 105 of the liquid crystal display device 100 except that the electrode pattern 105A does not extend along the left side of the display pixel area.

A reliability test as that described in Embodiment 1 was conducted for the liquid crystal display device 300. As a result, a defect occurred after 300 hours of electrical conduction through the liquid crystal layer when no voltage was applied through the electrode pattern 105A. On the contrary, no defect occurred in over 1000 hours of electrical conduction through the liquid crystal layer when a voltage of +3.3 V was applied through the electrode pattern 105A.

FIG. 6 illustrates still another liquid crystal display device 400 having the same rubbing directions on the CF substrate and the TFT substrate (represented by the arrows 301 and 302, respectively) as those of the liquid crystal display device 100 shown in FIG. 3. In the liquid crystal display device 400, an electrode pattern 105B was provided only along one side of the display pixel area which is interposed between the head of the arrow 301 (corresponding to the fourth corner 150) and the head of the arrow 302 (corresponding to the third corner 140). A reliability test as that described in Embodiment 1 was conducted for the liquid crystal display device 400. The electrode pattern 105B of the liquid crystal display device 400 is substantially the same as those of the liquid crystal display devices 100 and 300 except that the electrode pattern 105B extends only along the right side of the display pixel area 113 (i.e., between the third corner 140 and the fourth corner 150). As a result, a defect occurred after 300 hours of electrical conduction through the liquid crystal layer when no voltage was applied through the electrode pattern 105B. On the contrary, when a voltage of +3.3 V was applied through the electrode pattern 105B, no defect occurred after 700 hours of electrical conduction through the liquid crystal layer. After 800 hours, however, a defect occurred along a side of the display pixel area extending between the first corner 120 and the fourth corner 150 and along another side of the display pixel area extending between the second corner 130 and the third corner 140.

The electrode pattern of the present invention does not have to be provided along each of these three sides of the display pixel area. The electrode pattern of the present invention may be provided along at least one side of the display pixel area.

For example, with a generally rectangular display pixel area, the electrode pattern may be provided along two sides which are connected together by a corner of the generally rectangular display pixel area which is pointed to by an arrow representing the rubbing direction on one of the pair of substrates. Alternatively, the electrode pattern may be provided along a first pair of sides which are connected together by a corner of the generally rectangular display pixel area which is pointed to by an arrow representing the rubbing direction on one of the pair of substrates, and also along a second pair of sides which are connected together by another corner of the generally rectangular display pixel area which is pointed to by another arrow representing the rubbing direction on the other one of the pair of substrates. The first pair of sides and the second pair of sides may share one side with each other. This will be discussed in greater detail below with reference to FIG. 7, which illustrates a liquid crystal display device 400' having an electrode pattern 105C. In the illustrated example, the head of the arrow 301 representing the rubbing direction on the CF substrate points to the fourth corner 150. Therefore, the electrode pattern may be provided along two sides which are connected together by the fourth corner 150 (i.e., the side extending between the first corner 120 and the fourth corner 150, and the side extending between the third corner 140 and the fourth corner 150). Alternatively, the electrode pattern may be provided along two pairs of sides, each pair of sides being connected together by a corner of the generally rectangular display pixel area which is pointed to by an arrow representing the rubbing direction on one of the pair of substrates. The two pairs of sides may share one side with each other. When the display pixel area is in a rectangular shape, the electrode pattern may be provided as the electrode pattern 105A of the liquid crystal display device 300 shown in FIG. 5.

In each liquid crystal display device of the present embodiment, the pixel electrodes on the interlayer insulating film may or may not partially overlap at least one of the gate signal lines and the source signal lines.

Each liquid crystal display device of the present embodiment may be a reflective liquid crystal device in which the pixel electrodes and the ionic impurity adsorbing electrode pattern on the interlayer insulating film are made of a reflective metal material.

(Embodiment 3)

FIG. 8 illustrates a liquid crystal display device 500 according to Embodiment 3 of the present invention, with the same rubbing directions on the CF substrate and the TFT substrate (represented by the arrows 301 and 302, respectively) as those of the liquid crystal display device 100 shown in FIG. 3. As shown in FIG. 8, the liquid crystal display device 500 includes an electrode pattern which is divided into three segments 105E, 105F and 105G to each of which any electric potential is applied. The electrode pattern segments 105B, 105F and 105G are provided a side extending between the third corner 140 and the fourth corner 150, a side extending between the second corner 130 and the third corner 140, and a side extending between the fourth corner 150 and the first corner 120. A reliability test was conducted with a voltage application of +3.3 V through the electrode pattern segment 105E and +5.5 V through each of the electrode pattern segments 105F and 105G. As a result, the liquid crystal display device 500 did not have a defect in over 1000 hours of electrical conduction through the liquid crystal layer.

This shows that an electrode pattern can be divided into a plurality of segments to each of which any electric potential is applied individually as long as it is possible to apply through each electrode pattern segment a potential whose polarity is opposite to that of the ionic impurity to be adsorbed.

In the liquid crystal display device of the present embodiment, the pixel electrodes on the interlayer insulating film may or may not partially overlap at least one of the gate signal lines and the source signal lines.

The liquid crystal display device of the present embodiment may be a reflective liquid crystal device in which the pixel electrodes and the ionic impurity adsorbing electrode pattern segments on the interlayer insulating film are made of a reflective metal material.

In each of the above-described embodiments of the present invention, an acrylic resin is used as the interlayer insulating film. However, the interlayer insulating film may be made of any organic material such as acrylic resins or fluorine resins, TEOS (tetra ethyl ortho silicate), and the like. Preferred materials for the interlayer insulating film are those with which the interlayer insulating film can be deposited to a large thickness and which have a small dielectric constant.

As described above, the present invention provides a liquid crystal display device in which pixel electrodes are provided over gate signal lines and source signal lines via an interlayer insulating film interposed therebetween, wherein the interlayer insulating film extends to a surrounding region of a display pixel area on which an electrode pattern for adsorbing an ionic impurity is provided. The electrode pattern can be formed simultaneously with the pixel electrode from the same material, and it is not necessary to provide a protective film on the electrode pattern. Thus, it is possible to provide a liquid crystal display device having a good display quality without increasing the number of production steps.

An ionic impurity can be adsorbed onto the surface of the ionic impurity adsorbing electrode pattern by inputting a DC potential having the polarity opposite to that of the ionic impurity to the electrode pattern, thereby preventing the display quality from lowering due to the ionic impurity while improving the reliability over a long period of time.

Moreover, since the interlayer insulating film is made of an organic material, it is possible to reduce the capacitance at each intersection between the electrode pattern and a signal line, thereby preventing the capacitance from influencing the display quality.

An electric signal can be supplied to the electrode pattern by using: a DC power supply for driving ICs, or the like, of driver circuits; a DC power supply for supplying a ±potential for gate signals; a power supply for supplying rectangular wave signals such as source signals and common signals; and the like, which are used in the existing liquid crystal display devices. Therefore, it is not necessary to provide a separate source of input signal.

By covering the ionic impurity adsorbing electrode pattern with an alignment film, an electrically attracted ionic impurity can be adsorbed onto the alignment film itself, thereby further improving the reliability.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a pair of substrates opposing each other;
   a liquid crystal layer interposed between the pair of substrates;
   a plurality of switching elements arranged in a matrix pattern on one of the pair of substrates;
   gate signal lines for supplying gate signals for driving the switching elements;
   source signal lines for supplying display signals to the switching elements;
   an interlayer insulating film provided on one of the pair of substrates over the gate signal lines and the source signal lines; and
   pixel electrodes provided over the gate signal lines and the source signal lines via the interlayer insulating film, wherein:
      the interlayer insulating film on one of the pair of substrates extends to a surrounding region of a display pixel area;
      a continuous electrode pattern for adsorbing an ionic impurity is provided on the interlayer insulating film in the surrounding region so as to surround the display pixel area on all sides, wherein the continuous electrode pattern for adsorbing an ionic impurity is provided on only one of the substrates and is at least partially coplanar with the pixel electrodes; and wherein an electric signal which is input to the electrode pattern is supplied from at least one of a power supply for a source driving circuit and a power supply for a gate driving circuit.

2. A liquid crystal display device according to claim 1, wherein the pixel electrodes are provided to partially overlap at least one of the gate signal lines and the source signal lines.

3. A liquid crystal display device according to claim 1, wherein the pixel electrodes and the electrode pattern are made of a metal material having a reflective property.

4. A liquid crystal display device according to claim 1, wherein the electrode pattern is provided inward with respect to a sealing material with which the pair of substrates are attached together.

5. A liquid crystal display device according to claim 1, wherein the electrode pattern is covered with an alignment film.

6. A liquid crystal display device according to claim 1, wherein an electric signal having a DC potential is input to the electrode pattern.

7. A liquid crystal display device according to claim 1, wherein the interlayer insulating film is made of an organic material.

8. A liquid crystal display device according to claim 1, wherein the electrode pattern is formed simultaneously with the pixel electrodes.

9. A liquid crystal display device, comprising:
a pair of substrates;
a liquid crystal layer between the pair of substrates;
a plurality of switching elements arranged on one of the pair of substrates;
pixel electrodes provided in a display pixel area of the display device;
an insulating film on one of the pair of substrates and at least partially covering address lines, the insulating film extending to a surrounding region of the display pixel area;
an electrode pattern for adsorbing an ionic impurity provided over the insulating film in the surrounding region so as to surround the display pixel area on all sides thereof and so as to be at least partially coplanar with the pixel electrodes; and
wherein the electric signal which is input to the electrode pattern is supplied from at least one of a power supply for a source driving circuit and a power supply for a gate driving circuit.

10. A liquid crystal display device, comprising:
a pair of substrates opposing each other;
a liquid crystal layer interposed between the pair of substrates;
a plurality of switching elements arranged in a matrix pattern on one of the pair of substrates;
gate signal lines for supplying gate signals for driving the switching elements;
source signal lines for supplying display signals to the switching elements;
an interlayer insulating film provided on one of the pair of substrates over the gate signal lines and the source signal lines;
pixel electrodes provided over the gate signal lines and the source signal lines via the interlayer insulating film, wherein:
the interlayer insulating film on one of the pair of substrates extends to a surrounding region of a display pixel area;
an electrode pattern for adsorbing an ionic impurity is provided on the interlayer insulating film in the surrounding region on only one of the substrates, said pattern being coplanar with the pixel electrodes;
the pair of substrates are arranged so that a rubbing direction of one of the substrates which is represented by a first arrow crosses a rubbing direction of the other one of the substrates which is represented by a second arrow, the first and second arrows each extending from its tail to its head; and
the electrode pattern extends only along of one side of the display pixel area interposed between the head of the first arrow and the head of the second arrow, and wherein an electric signal which is input to the electrode pattern is supplied from at least one of a power supply for a source driving circuit and a power supply for a gate driving circuit.

11. A liquid crystal display device, comprising:
a pair of substrates opposing each other;
a liquid crystal layer interposed between the pair of substrates;
a plurality of switching elements arranged in a matrix pattern on one of the pair of substrates;
gate signal lines for supplying gate signals for driving the switching elements;
source signal lines for supplying display signals to the switching elements;
an interlayer insulating film provided on one of the pair of substrates over the gate signal lines and the source signal lines;
pixel electrodes provided over the gate signal lines and the source signal lines via the interlayer insulating film, wherein:
the interlayer insulating film on one of the pair of substrates extends to a surrounding region of a display pixel area;
an electrode pattern for adsorbing an ionic impurity is provided on the interlayer insulating film in the surrounding region; and
the electrode pattern is divided into a plurality of segments; and an electric signal is individually input to each of the segments, and wherein all segments of the electrode pattern for adsorbing an ionic impurity are provided on the same substrate and are at least partially coplanar with the pixel electrodes so that the segments are at a different elevation(s) than the gate signal lines.

12. A liquid crystal display device, comprising:
a pair of substrates opposing each other;
a liquid crystal layer interposed between the pair of substrates;
a plurality of switching elements arranged in a matrix pattern on one of the pair of substrates;
gate signal lines for supplying gate signals for driving the switching elements;
source signal lines for supplying display signals to the switching elements;
an interlayer insulating film provided on one of the pair of substrates over the gate signal lines and the source signal lines;
pixel electrodes provided over the gate signal lines and the source signal lines via the interlayer insulating film, wherein:

the interlayer insulating film on one of the pair of substrates extends to a surrounding region of a display pixel area;

an electrode pattern for adsorbing an ionic impurity is provided on the interlayer insulating film in the surrounding region;

the display pixel area has a generally rectangular shape;

the pair of substrates are arranged so that a rubbing direction of one of the substrates which is represented by a first arrow crosses a rubbing direction of the other one of the substrates which is represented by a second arrow, the first and second arrows each extending from its tail to its head; and the electrode pattern extends only along three sides of the display pixel area, including a first side interposed between the head of the first arrow and the head of the second arrow, and second and third sides which respectively extend from opposite ends of the first side.

13. A liquid crystal display device, comprising:

a pair of substrates opposing each other;

a liquid crystal layer interposed between the pair of substrates;

a plurality of switching elements arranged in a matrix pattern on one of the pair of substrates;

gate signal lines for supplying gate signals for driving the switching elements;

source signal lines for supplying display signals to the switching elements;

an interlayer insulating film provided on one of the pair of substrates over the gate signal lines and the source signal lines;

pixel electrodes provided over the gate signal lines and the source signal lines via the interlayer insulating film, wherein:

the interlayer insulating film on one of the pair of substrates extends to a surrounding region of a display pixel area;

an electrode pattern for adsorbing an ionic impurity is provided on the interlayer insulating film in the surrounding region;

the liquid crystal display device includes a generally rectangular display pixel area;

a rubbing direction of at least one of the substrates is represented by an arrow pointing to a corner of the generally rectangular display pixel area; and the electrode pattern extends along only two sides of the generally rectangular display pixel area which are connected together by the corner that is pointed to by the arrow.

14. A liquid crystal display device, comprising:

a pair of substrates opposing each other;

a liquid crystal layer interposed between the pair of substrates;

a plurality of switching elements arranged in a matrix pattern on one of the pair of substrates;

gate signal lines for supplying gate signals for driving the switching elements;

source signal lines for supplying display signals to the switching elements;

an interlayer insulating film provided on one of the pair of substrates over the gate signal lines and the source signal lines;

pixel electrodes provided over the gate signal lines and the source signal lines via the interlayer insulating film, wherein:

the interlayer insulating film on one of the pair of substrates extends to a surrounding region of a display pixel area;

an electrode pattern for adsorbing an ionic impurity is provided on the interlayer insulating film in the surrounding region;

the liquid crystal display device includes a generally rectangular display pixel area;

a rubbing direction of one of the substrates is represented by a first arrow pointing to a first corner of the generally rectangular display pixel area, and a rubbing direction of the other one of the substrates is represented by a second arrow pointing to a second corner of the generally rectangular display pixel area; and the electrode pattern extends along only a first pair of sides which are connected together by the first corner and along a second pair of sides which are connected together by the second corner, wherein the first pair of sides and the second pair of sides may share one side with each other.

* * * * *